Patented Sept. 15, 1936

2,054,099

UNITED STATES PATENT OFFICE 2,054,099

SYNTHETIC RESINS

Henry S. Rothrock, Wilmington, Del., assignor to E. I. du Pont de Nemours & Company, Wilmington, Del., a corporation of Delaware No Drawing. Application December 17, 1935, Serial No. 54,947

9 Claims. (Cl. 260—2)

This invention relates to synthetic resins, and more particularly to a new process for polymerizing certain compounds.

It is well known that the alkylene oxides, e. g., ethylene oxide, propylene oxide, butylene oxide, etc., are readily polymerized by such agents as ultraviolet light, calcium oxide, zinc chloride, metallic sodium, benzoyl peroxide, ferric chloride, and stannic chloride. The products obtained by polymerization of the alkylene oxides are water-soluble or water sensitive. Cyclohexene oxide, on the other hand, is difficult to polymerize as was reported by Conant and Peterson, J. Am. Chem. Soc. 54, 628–635 (1932) who subjected cyclohexene oxide to very high pressures in the presence of benzoyl peroxide. Polymerization was scarcely appreciable after 72 hours and not until 168 hours was the viscous liquid obtained from which the solid polymer was separated by evaporating off the unpolymerized material. This polymerization process because of the disadvantages of high pressure and extended time is not applicable to large scale operations.

This invention has as an object a process for polymerizing cyclohexene oxide and other polymerizable carbocyclic epoxy compounds. A further object is the preparation of useful compositions of matter from carbocyclic epoxy compounds. Other objects will appear hereinafter.

These objects are accomplished by polymerizing, at atmospheric pressures and in the presence of a suitable catalyst, carbocyclic epoxy compounds in which the oxygen is linked to adjacent carbon atoms of a carbocyclic nucleus, and isolating and purifying the products.

I have discovered a new process for polymerizing compounds of the type of cyclohexene oxide and dihydronaphthalene oxide, which does not require the use of high pressures and which is cheap and readily adapted to large scale operations. This process consists in polymerizing such materials in a suitable apparatus at ordinary temperatures and pressures by adding to the unpolymerized substances relatively small quantities of a polymerization catalyst of the kind described more in detail hereinafter and exemplified by halides such as aluminum chloride, stannic chloride, or ferric chloride, and after cooling and stirring allowing the temperature of the reaction mixture to rise slowly to a point usually substantially less than 100° C. When the polymerization has been accomplished to the desired extent, as indicated by a progressive increase in viscosity during and after the addition of the polymerizing catalyst, the reaction mixture is washed to remove the catalyst, further purified if desired, and dried.

The method for carrying out my invention will be apparent from the following examples which are submitted to illustrate but not to limit the invention:

Example I

One hundred fifty grams of cyclohexene oxide was placed in a 500 cc. flask equipped with stirrer, dropping funnel, and thermometer. After cooling the flask and its contents externally with ice, 18 grams of stannic chloride was added drop by drop while the mixture was stirred vigorously. During the addition of stannic chloride, considerable heat was evolved, and the temperature was allowed to rise slowly to 70° C. The reaction mixture became progressively more viscous during this time. After all of the stannic chloride had been added, the mixture was stirred for an hour at 70° C. The hot mixture was then poured with vigorous stirring into a boiling mixture of ethyl alcohol and concentrated aqueous hydrochloric acid. The polymerized cyclohexene oxide was separated, and the operation was repeated. The polymer was then washed with several successive portions of hot alcohol, and was dried in a vacuum oven at 100° C. The product was a light colored, brittle, transparent resin, obtained in nearly quantitative yield. It was soluble in toluene, butyl acetate, China-wood oil, and aliphatic hydrocarbons, and hot paraffin wax, and was compatible with nitrocellulose. It was also compatible with ethyl cellulose solutions but dry films of the ethyl cellulose-cyclohexene oxide polymer mixture were incompatible. The resin was insoluble in alcohol, acetone, and β-ethoxyethanol.

Example II

To 5 parts of cyclohexene oxide in a suitable apparatus was slowly added one part of anhydrous ferric chloride. During this time a vigorous exothermic reaction occurred. The mixture was heated at 75° C. for 20 hours. Upon cooling, the product was a viscous liquid. Unpolymerized cyclohexene oxide was evaporated off under vacuum distillation, leaving a solid resin similar in appearance and properties to that obtained as in Example I.

Example III

Fifty grams of 1,4-dihydronaphthalene oxide of the formula

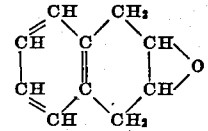

was placed in an apparatus similar to that described in Example I and was melted by warming to 30° C. Two and a half grams of stannic chloride was then added drop by drop as in Example I. An exothermic reaction took place during this operation, and the temperature of the reaction mixture was allowed to rise to 80–90° C. After all of the stannic chloride had been added, the resulting thick resinous material was stirred vigorously in boiling dilute aqueous hydrochloric acid, and was then washed with hot water until free of acid. Upon drying in a vacuum oven at 100° C., a clear, transparent, reddish resin was obtained, which was soluble in toluene, butyl acetate, and China-wood oil, and was compatible with nitrocellulose. It was insoluble in alcohol and in aliphatic hydrocarbons.

Example IV

To a portion of cyclohexene oxide in a suitable container was added slowly anhydrous aluminum chloride in an amount equal to approximately 10% of the weight of the cyclohexene oxide. An exothermic reaction occurred. The product was a viscous liquid containing unpolymerized cyclohexene oxide. Upon washing this liquid with water to remove aluminum chloride and distilling off unpolymerized cyclohexene oxide in vacuo a clear, transparent, brown solid resin can be obtained.

The catalysts operable in this invention are the halides, other than fluorides, of amphoteric elements, that is, of elements capable of forming hydroxides (or the oxides if the hydroxides do not exist) which are both basic and acidic. Other halides of this kind which I have substituted for those mentioned in the examples are stannic bromide, stannic iodide, zinc chloride, zinc bromide, silicon tetrachloride, titanium tetrachloride, and less preferably aluminum bromide and bismuth trichloride. Additional halides which are useful in the present invention are those of Ge, Pb, As, Sb, Ga, In, and Th.

In the case of elements having only one valence all that is necessary for selection of a suitable catalyst is to know whether the hydroxides are amphoteric. Thus, zinc chloride and aluminum chloride are catalysts because zinc hydroxide and aluminum hydroxide are amphoteric. Similarly, carbon tetrachloride is not a catalyst because $C(OH)_4$ (i. e. $H_2CO_3$ or $CO_2$) is not amphoteric and because carbon tetrachloride is not a salt. For the same reason calcium chloride is not a catalyst since calcium hydroxide is not amphoteric.

When an element yields amphoteric oxides or hydroxides at one valence and not at another the catalyst is the halide of the element in which the element is present in the valence it has in its amphoteric oxide or hydroxide. The halides used in the present invention are in all instances those having an atomic weight of at least that of chlorine and may be defined as a salt of the formula $MX_b$, X being a halogen of atomic weight at least that of chlorine (i. e. 35.46) and M being an element of valence $b$ whose hydroxide $M(OH)_b$ is amphoteric. For instance the oxide or hydroxide of trivalent iron is amphoteric and those of divalent iron are not amphoteric. It follows from the method of selection given above, which I have verified in this and other instances, that ferric chloride is a polymerizing catalyst for cyclohexene oxide and similar compounds disclosed herein whereas ferrous chloride is not a catalyst.

It is to be observed that although the alkylene oxides can be polymerized by a large number of agents, such as calcium chloride, metallic sodium, ultra violet light, etc., which do not correspond to the requirement for the catalyst given above, these additional agents are wholly ineffective for polymerizing cyclohexene oxide and the other oxides mentioned herein.

The present invention is applicable to all carbocyclic epoxy compounds in which the oxygen is linked to adjacent carbon atoms which are both members of a carbocyclic group. I may for instance use alkyl substituted cyclohexene oxides such as methyl, dimethyl, isopropyl, butyl, etc., cyclohexene oxides, as well as corresponding substituted dihydronaphthalene oxides and other partially or completely hydrogenated unsubstituted or substituted naphthalene oxides. I may also use carbocyclic epoxy compounds containing less than six carbon atoms in the ring, provided the oxygen is linked to adjacent carbon atoms. Compounds of the kind mentioned here may be interpolymerized, as for instance by using any combination of these compounds. The preferred materials, however, are the carbocyclic epoxy compounds of the hydroaromatic series such as cyclohexene oxide and dihydronaphthalene.

The present catalytic polymerization reaction may be carried out in solution in organic solvents such as benezene, toluene, chloroform, trichloroethylene, heptane, etc. Aromatic and aliphatic hydrocarbons and chlorinated hydrocarbons are in general satisfactory.

The present process is most conventionally carried out at atmospheric pressure and at temperatures below 100° C., but the use of higher pressure and temperatures is not precluded.

The polymers of this invention are useful as ingredients of various kinds of coating compositions, as for instance oil type varnishes, paints and enamels. A lacquer containing the cyclohexene oxide polymer and nitrocellulose gives clear compatible films, and films of the unmodified polymer, applied as a clear coating over wood and steel, were found to have good water and alkali resistance.

The present process of effecting the polymerization reaction in a relatively short time at atmospheric pressure is a valuable improvement over the prior art practice which requires higher pressure. The process claimed herein is therefore much simpler and cheaper to operate than that used in the prior practice. The present invention is also practiced with more stable and less expensive catalysts than those heretofore used in attempting to polymerize cyclohexene oxide. The polymers of the present invention are chemically wholly unlike the polymers obtained from the alkylene oxides which are usually water-soluble or water-sensitive products of low softening points whereas the polymers prepared in accordance with the foregoing examples are water-insoluble, water-insensitive, stable, and relatively high softening.

As many apparently widely different embodiments of this invention may be made without departing from the spirit and scope thereof, it is to be understood that I do not limit myself to the specific embodiments thereof except as defined in the appended claims.

I claim:

1. A process which comprises polymerizing in the presence of a catalyst an epoxy compound in which the oxygen is linked to adjacent carbon atoms in a carbocyclic ring, said catalyst being a halide of the general formula $MX_b$ where X is a halogen atom of atomic weight at least that of chlorine, M is an element of valence $b$ whose hydroxide $M(OH)_b$ is amphoteric.

2. A process which comprises polymerizing cyclohexene oxide in the presence of a small amount of a halide of the general formula $MX_b$ where X is a halogen atom weight at least that of chlorine, M is an element of valence $b$ whose hydroxide $M(OH)_b$ is amphoteric.

3. A process which comprises polymerizing dihydronaphthalene oxide in the presence of a small amount of a halide of the general formula $MX_b$ where X is a halogen atom of atomic weight at least that of chlorine, M is an element of valance $b$ whose hydroxide $M(OH)_b$ is amphoteric.

4. Polymerized dihydronaphthalene oxide.

5. The process set forth in claim 1 in which the halide is stannic chloride.

6. The process set forth in claim 1 in which the halide is ferric chloride.

7. The process set forth in claim 2 in which the halide is stannic chloride.

8. The process set forth in claim 2 in which the halide is ferric chloride.

9. The process set forth in claim 3 in which the halide is stannic chloride.

HENRY S. ROTHROCK.